Nov. 6, 1928.                                        1,690,115
T. B. HUESTIS
METHOD OF MAKING SHOE SOLES
Filed July 8, 1927
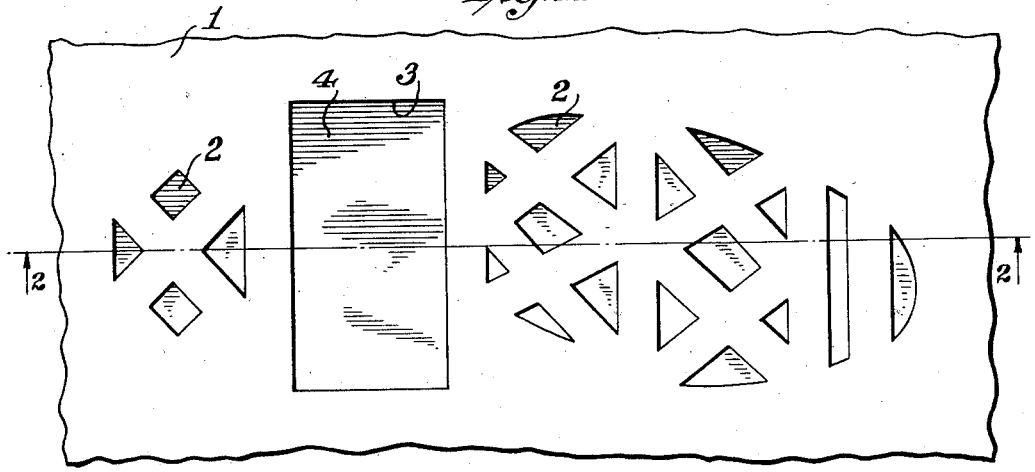
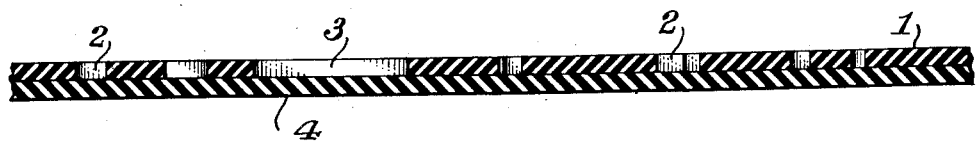
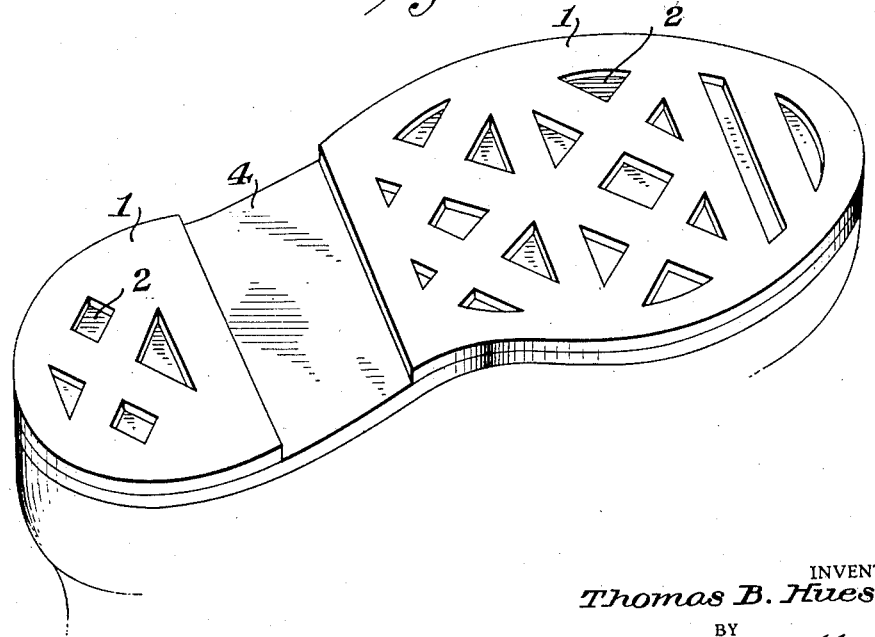
INVENTOR
Thomas B. Huestis
BY
ATTORNEY Patented Nov. 6, 1928.

1,690,115

UNITED STATES PATENT OFFICE.

THOMAS B. HUESTIS, OF BRISTOL, RHODE ISLAND, ASSIGNOR TO NATIONAL INDIA RUBBER COMPANY, OF BRISTOL, RHODE ISLAND, A CORPORATION OF RHODE ISLAND.

METHOD OF MAKING SHOE SOLES.

Application filed July 8, 1927. Serial No. 204,245.

This invention relates to an improved method of forming shoe soles. More particularly it relates to an improved method for forming a rubber sole having a deeply grooved or indented tread.

The soles of shoes have heretofore been variously manufactured or fashioned with anti-skidding surfaces but generally such methods have not been sufficiently economical and rapid, particularly when the anti-skid design is more than superficially deep.

The present invention aims to provide a method of manufacturing soles for rubber and other plastic footwear which will enable any of the wide variety of anti-skid conformations to be formed accurately, reliably, and rapidly, and less expensively than heretofore.

Other objects will be apparent from the specification and accompanying drawings in which latter, Fig. 1 is a plan view of the unit comprising the perforated sheet of rubber composition superimposed upon an unperforated layer of sheet material;

Fig. 2 is a longitudinal section along the line 2—2 of Fig. 1; and

Fig. 3 is a perspective view of a completed sole as it appears upon a shoe upper.

In carrying out the invention in its preferred form, a sheet of any desired and suitable rubber composition is prepared by calendering or otherwise in one or more layers of the required thickness. The sheet material is then perforated or indented by a punch or knife or otherwise into a plurality of spaced groups of holes 2, defining the desired anti-skid surface of the heel and ball portions of the shoe sole. A strip of material which is positioned intermediate the groups of perforations 2 and which would normally constitute the shank of the sole to be formed is removed, leaving a hole 3 which extends laterally sufficiently beyond the perforations 2 so that in the later operation of cutting the sole, the heel and ball portions of the sheet will be separated and spaced the distance of the shank of the sole. A plurality of sets of perforations, as just described, are cut through the sheet material in spaced relation to each other in order that a body of rubber composition having the outlines of a sole can subsequently be cut from the sheet 1 around each set of the perforations 2 and through the hole 3. The sheet of material prepared in this way constitutes a layer having the thickness of the grooved portion of the completed sole.

A second sheet 4 of vulcanizable rubber composition is prepared of a suitable thickness and composition to make up the desired total thickness of the shoe sole. The perforated sheet 1 is superimposed thereon and adhered to the sheet 4, ordinarily the tackiness of the unvulcanized rubber composition permitting this to be done without a solvent or cement, thus a unit is formed which can be cut into complete soles either manually or mechanically, the sole cutting knife passing around each set of holes 2 and through both ends of the hole 3.

By the method described, there has been obtained a sole formed of the foundation sheet material, the ball and heel portions of which are reinforced by accurately spaced tread portions defined by the perforated sheet material. The soles obtained uniformly in this way can be built upon a shoe upper in the regular way and vulcanized if desired, as is usually preferred in a suitable manner for the particular composition used.

It is to be understood that the design provided in sheet 1 may be of any desired shape and arrangement. If through and through holes or perforations are utilized and the invention is particularly intended to handle deep designs difficult to manufacture, these may be provided in the heel-portion alone or in the ball-portion alone, or such perforations may take the form of indentures, or they may be omitted entirely. In all forms of the soles, however, the cutouts 3 are intended to be provided in the sheet 1 and of course should extend transversely completely across the shank of each sole to permit the shank portion of the tread layer to be eliminated in the final operation of cutting out the sole unit. These and other modifications are comprehended within the broad aspects of the invention and the claims should be read in the light thereof.

Having thus described my invention what I claim and desire to protect by Letters Patent is:

1. The method of forming shoe soles which comprises forming in sheet material an opening of at least the outside width of a shoe sole shank, assembling the sheet material and a foundation of sheet material to form a plied unit, and forming from the unit a shoe sole by cutting through the said opening.

2. The method of forming shoe soles which comprises forming in sheet material an opening of at least the width of a shoe sole shank, perforating the sheet material on at least one side of the opening, assembling the sheet material and a foundation of sheet material to form a plied unit, and severing from the assembly a shoe sole with the opening extending laterally entirely across the shank and with some at least of the perforated portions of the sheet material within the confines of the sole.

3. The method of forming shoe soles which comprises forming in sheet material a plurality of openings in spaced relation, each of said openings being at least as wide as a shoe sole shank, superimposing the sheet material on a foundation of unperforated sheet material to form the complete thickness of stock for soling and severing therefrom shoe soles in each of which one of the openings extends entirely across the shank.

4. That method of forming shoe soling which comprises forming an anti-skid configuration in a sheet of rubber composition, aperturing the sheet of composition between what is to be the heel-and ball-portions of a sole, plying the said sheet up with at least a second sheet of composition, and forming from the plied stock a sole-unit comprising spaced apart heel-and ball-portions united only by the second mentioned sheet of composition.

5. That method of forming shoe soling which comprises forming a sheet of rubber composition of less thickness than the complete sole to be formed and with an anti-skid configuration on at least a portion of its surface, removing the composition from what is to be the shank portion, plying up such sheet with at least another sheet of composition, and severing a sole-unit from such assemblage in which the ball-and heel-portions of the tread surface of the first mentioned sheet are connected only by the second mentioned sheet.

6. That method of forming shoe soles which includes forming the heel-and ball-portions of an anti-skid configuration in a sheet of composition and in predetermined spaced relation, removing the composition from between what are to be the heel-and ball-portions, plying up such sheet with another sheet of composition, and severing a sole-unit therefrom with the heel-and ball-portions in the first mentioned sheet united only by the second mentioned sheet.

Signed at Bristol, county of Bristol, State of Rhode Island, this 30th day of June, 1927.

THOMAS B. HUESTIS.